United States Patent [19]

Clancy

[11] Patent Number: 4,736,927
[45] Date of Patent: Apr. 12, 1988

[54] LINEAR FORCE DEVICE

[75] Inventor: John P. Clancy, St. Louis County, Mo.

[73] Assignee: The United States of America as represented by the Administrator of the National Aeronautics and Space Administration, Washington, D.C.

[21] Appl. No.: 45,743

[22] Filed: Apr. 30, 1987

Related U.S. Application Data

[63] Continuation of Ser. No. 790,596, Oct. 23, 1985, abandoned.

[51] Int. Cl.⁴ ............................................. B66F 3/24
[52] U.S. Cl. .............................. 254/93 R; 254/93 H; 72/705; 269/246; 269/147
[58] Field of Search .............. 269/240, 246, 250, 252, 269/261, 284, 147–149, 263, 88; 81/491; 254/93 H, 93 R; 72/705

[56] References Cited

U.S. PATENT DOCUMENTS

| | | | |
|---|---|---|---|
| 1,806,527 | 5/1931 | Eisemann | 269/252 |
| 2,481,477 | 9/1949 | Peery | 74/424.8 |
| 2,663,929 | 12/1953 | Carpenter | 29/290 |
| 2,737,709 | 3/1956 | Lovelace | 29/290 |
| 3,762,688 | 10/1973 | Leonhardt | 254/93 R |
| 3,891,187 | 6/1975 | Bearden, Jr. | 254/93 R |
| 3,987,681 | 10/1976 | Keithley et al. | 74/89.15 |
| 4,014,443 | 3/1977 | Asari et al. | 214/27 |
| 4,024,959 | 5/1977 | Gruner | 214/1 BB |
| 4,184,799 | 1/1980 | Arndt | 414/54 |
| 4,339,113 | 7/1982 | Vosper | 254/13 |
| 4,409,866 | 10/1983 | McBride | 81/491 |
| 4,461,457 | 7/1984 | Steele | 254/93 R |

FOREIGN PATENT DOCUMENTS 153386 11/1951 Australia ............................ 269/263

Primary Examiner—Frederick R. Schmidt
Assistant Examiner—Judy J. Hartman
Attorney, Agent, or Firm—Hardie R. Barr; John R. Manning; Edward K. Fein

[57] ABSTRACT

The object of the invention is to provide a mechanical force actuator which is light weight and manipulatable and utilizes linear motion for push or pull forces while maintaining a constant overall length.

The mechanical force producing mechanism comprises a linear actuator mechanism (22,23) and a linear motion shaft (11) mounted parallel to one another. The linear motion shaft (11) is connected to a stationary or fixed housing (12) and to a movable housing (26) where the movable housing (26) is mechanically actuated through actuator mechanism (22,26) by either manual means (21) or motor means (20). The housings (12,26) are adapted to releasably receive a variety of jaw or pulling elements (28) adapted for clamping or prying action. The stationary housing (12) is adapted to be pivotally mounted to permit an angular position of the housing to allow the tool to adapt to skewed interfaces. The actuator mechanisms (22,23) is operated by through a gear train (19) to obtain linear motion of the actuator mechanism.

13 Claims, 2 Drawing Sheets

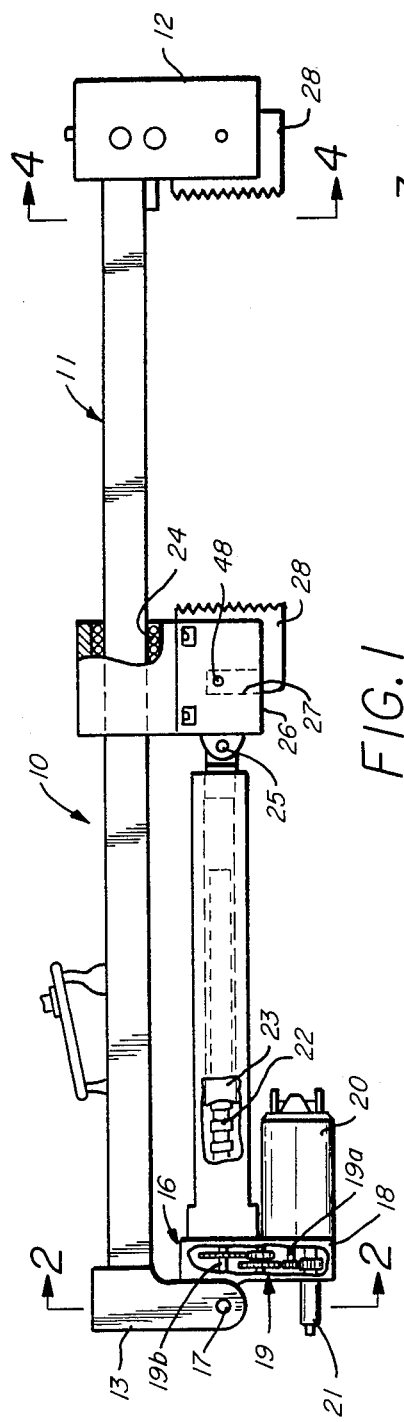
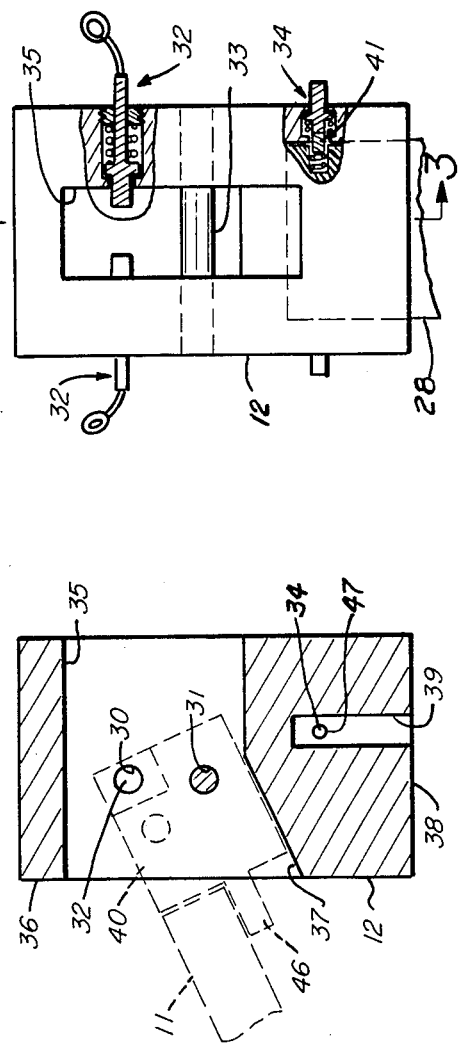
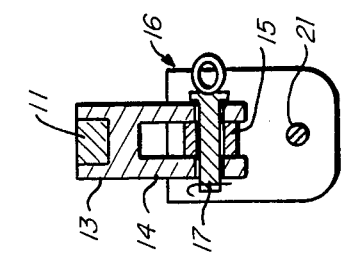

4,736,927

1

LINEAR FORCE DEVICE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This application is a continuation of application Ser. No. 790,596, filed Oct. 23, 1985, now abandoned.

TECHNICAL FIELD

This invention relates to universal clamps, and more particularly, to a lightweight easily maneuverable clamping device for producing push or pull forces on a work object.

BACKGROUND ART

Prior art includes the following patents:

U.S. Pat. No. 2,737,709, issued to W. H. Lovelace on Mar. 13, 1956, discloses an apparatus for handling articles such as automobile radiators. A guide motor supplies rotational energy via a driven sprocket to an externally threaded shaft. Mounted on the shaft is a carriage which threadedly engages the shaft so that the carriage may move along a vertical guide column located next to the threaded shaft. The carriage contains a work table with a C-clamp attached for holding the work piece. The threaded shaft extends through the cariage and the carriage traverses the fixed length of the drive screw.

U.S. Pat. No. 3,987,681, issued to Keithley et al on Oct. 26, 1976, discloses a power driven clamping device mounted on the bottom bolster of a press. An air motor is attached to a geat unit which selectively rotates an elongated drive sleeve in opposite directions. The bottom portion of a clamping rod is threadably engaged to the interior threads of the drive sleeve so that the clamping rod may move linearly and clamp an adaptor plate in relation to the bolster. The clamping rod has a longitudinal slot formed in its exterior surface which engages a guide pin in the housing of the clamping device to allow the rod to move in a linear path. The clamping rod has an offset head at its top end which clamps the adaptor plate against the bolster. The Keithley device applies force to clamped adaptor which is inherently non co-linear with axis of travel of clamping rod along the sleeve.

U.S. Pat. No. 2,663,929, issued to L. M. Carpenter on Dec. 29, 1953, discloses a radiator bench having a base with an elevator drive screw and guide rails adjacent to the screw. A motor drives a housing along the screw while the weight of the housing is supported by the guide rails and an elevator platform mounted on the housing. The elevator drive screw extends through a housing and the housing traverses the fixed length of the drive screw.

U.S. Pat. No. 2,481,477, issued to W. E. Peery on Sept. 6, 1949, discloses a typical screw and nut actuator used to operating movable parts. An electric motor and gear system drive a rotating nut, causing it to rotate about a lead screw thereby affecting movement along the screw in a direction depending upon the direction of motor rotation. Peery discloses a screw and nut arrangement in combination with other elements to actuate a bed.

2

U.S. Pat. No. 4,024,959, issued to H. Gruner on May 24, 1977, discloses a handling system incorporating hydraulic and electric power systems in which the position of a gripper is controlled by four electric motors, two of which rotate threaded spindles so that a crosshead member containing threaded bores can be directed along two perpendicular axes. The gripper comprises a number of jaws controlled by hydraulic pistons. Two jaws are caused to approach one another by means of pressure supplied through connecting lines so that their corresponding pistons simultaneously move in opposite directions. The threaded spindle extends through a threaded base in the crosshead carrying an arm and is attached to the arm via a spindle bearing. Rotation of the spindle extends the arm (which also extends through the crosshead) along its axis.

U.S. Pat. No. 4,184,799, issued to M. Arndt on Jan. 22, 1980, discloses an arrangement which contains a gripping mechanism comprising slidably mounted gripper arm pairs on parallel rods and rotatable gripper plates. Outward movement of the gripper arms is carried out by means of a "hydraulic-respectively pneumatic-cylinder unit" mounted between the pairs of gripper arms. Clamping motion is carried out by a spring, also mounted between the gripper arm pairs. Action of gripper arms toward and away from each other to effect clamping action is accomplished by pneumatic-hydraulic and spring action disposed between and interconnecting the gripper jaws.

U.S. Pat. No. 4,014,443, issued to A. Asari et al on Mar. 29, 1977, discloses a device for delivering articles containing a moving clamp having jaws which are actuated by a linear drive source. The clamping movement is controlled by the simultaneous rotation of two running rods in opposite directions so that the attached jaws can open or close depending on the direction of the linear actuator. The rotation of the running rods may be controlled by such means as a rack-and-pinion mechanism, a slide-rod mechanism, a gear meachanism, or a cylindrical cam mechanism. In all cases the movement of the clamping jaws disclosed in the Asari et al patent is rotational.

DISCLOSURE OF THE INVENTION

This invention relates to a mechanical force producing mechanism comprising a linear actuator and a linear motion shaft mounted parallel to one another. The linear motion shaft is connected to a stationary jaw housing and to a movable jaw housing where the movable jaw housing is mechanically actuated through a power thread connection on a linear actuator by either manual or motor means. The jaw housings are adapted to receive a variety of jaw of pulling elements for clamping or prying action. The stationary jaw housing is adapted to be pivotally mounted to permit an angular position of the jaw housing to allow the tool to adapt to skewed interfaces. The power thread connection is operated by a gear box to obtain linear motion of the linear actuator.

BRIEF DESCRIPTION OF THE DRAWINGS

Referring now to the drawings, FIG. 1 illustrates a side view, a linear actuation device embodying the present invention;

FIG. 2 is a view taken along line 2—2 of FIG. 1;

FIG. 3 is a cross sectional view through a stationary jaw housing of the device taken along line 3—3 of FIG. 4;

FIG. 4 is an end view of FIG. 3 and illustrating in partial detail, locking details for the device;

BEST MODE OF CARRYING OUT THE INVENTION

Figure 7:
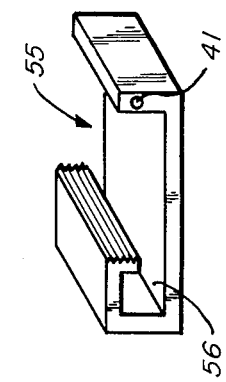
FIGS. 6 through 9 are views of various types of jaw and pulling mechanisms which can be employed with the present invention.

Referring now to FIG. 1, the force actuating mechanism 10 of the present invention includes a linear motion shaft member 11 which is an elongated bar member of square cross section. Attached at one end of the shaft 11 is a fixed clamp block or jaw housing 12 which constitutes a tool attachment housing. At the other end of the shaft 11 is a mounting flange 13. Intermediate of the ends of the shaft 11 is a movable clamp block or jaw housing 26 which is slidably mounted on the linear motion shaft 11.

The mounting flange 13 is welded or otherwise suitable attached to the end of the linear motion shaft 11 and has depending bifurcated leg portions 14 (See FIG. 2) which receive stub member 15 attached to an actuator housing 16. The stub member 15 is pivotally attached or connected to the bifurcated leg portions 14 by a connecting pin 17.

The actuator housing 16 includes a gear box portion 18 with a gear train 19. The gear train input shaft 19a is connected to an electric motor 20. The input shaft 19a is also coupled to an external manual drive shaft 21. The output shaft 19b of the gear train is attached to an externally threaded inner shaft 22 which is threadedly received within an internally threaded outer shaft 23. The motor 20, gear train 19 and the inner shaft 22 and outer shaft 23 are available at present from Warner Electric Brake and Clutch Co., 449 Gardner St., South Beloit, Ill. as Part No. DCA-10PB. The motor is d.c. operated which is convenient for battery operation but may be an A/C motor if desired.

When the motor operates the gear train 19, the inner shaft 22 only is rotated so that the outer shaft 23 is slidably moved through an opening in the end surface of the power housing 16. The drive shaft 22 and outer shaft 23 constitute an actuator mechanism. The outer shaft 23 is attached by a pivot pin 25 to the movable jaw housing or clamp block 26 which constitutes a tool attachment housing.

The movable jaw housing 26 is rectangular in shape and has a set of internal bearings 24 which ride on the outer surfaces of the linear motion shaft 11 to guide the motion of the jaw housing 26 linearly and parallel to the linear motion shaft 11. The bearing assembly for the jaw housing 26 can be obtained from Turnomat Div. of Heil Grinding and Mfg. Co., 455 Adirondock, Rochester, N.Y. as Part No. BUS-CA 1500. The movable jaw housing 26 has an upwardly extending internal rectangularly shaped recess 27 in its lower surface for receiving a jaw member or clamping block 28. Thus, when the motor is operated, the threaded inner shaft 22 will move the threaded outer shaft 23 and the attached clamping block 26 linearly either toward or away from the fixed clamping block 12 dependent upon the rotation of the motor. In the event the manual operation of the device is required, the stub shaft 21 can be rotated by a gear handle without use of the motor 20.

As shown in FIGS. 3 and 4, the fixed clamp block 12 has two vertically spaced openings 30 and 31 in the vertical sides of the clamping block 12, the upper opening 30 receiving a spring loaded pin retaining member 32 and the lower opening 31 being sized to receive a retaining pin 33. In FIG. 4, the retaining pin is shown and is used to pivotally coupled a clamp block flange 40 (shown in dashed line in FIG. 3) to the clamping block 12. In the lower section of the clamp block 12 is a spring loaded pin means 34 for disengaging spring loaded pins 41 in the jaw members. The pin means 34 are located adjacent to the recess 39 in the clamping block 12. As shown in FIGS. 3 and 4, the clamping block 12 is substantially rectangular in a vertical configuration and substantially square in cross section. The clamping block 12 has a rectangularly shaped opening 35 in a forward face 36 sized to receive a clamp block flange 40 (see FIG. 5). The opening 35 also has a forward inclined surface 37 extending inwardly and upwardly from its forward face 36 at an angle of 30° with respect to linear motion shaft 11 to permit the clamp block 12 to be pivoted to a second position relative to the linear motion shaft 11 and the clamp block flange 40.

Extending uwpardly from the bottom face 38 of the clamping block 12 is a rectangular shaped, elongated opening or recess 39 in the block 12 which is adapted to receive a mating locking flange of a jaw member or tool means. Spring loaded pin means 34 are received in the clamping block 12. The inward travel of pin members 34 toward the recess 39 is limited, and a spring between a flange on pin member 34 and a closure member provides a resilient bias tending to hold the pin members 34 in a direction outwardly from recess 39. Spring loaded pin means 41 in the locking flange of a jaw member provide a pin member which is normally arranged to resiliently project from the locking flange of a jaw member. When a jaw member is inserted in the clamping block recess 39, the spring loaded pin members 41 enter the openings 47 in the block 12 and move the pin members 34 outwardly, locking the jaw member in place. To release a jaw member, the pin members 34 are moved inwardly to depress the pin members 41 until the jaw member is released.

Figure 5:
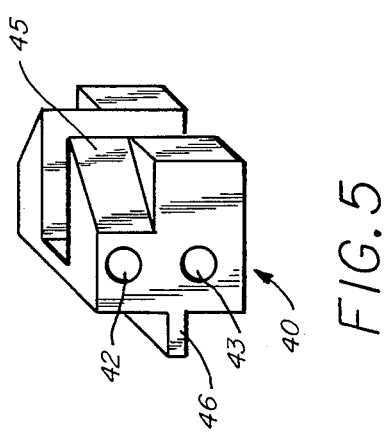
FIG. 5 is a perspective view of a block flange used to attach the linear motion shaft to the stationary jaw housing.

Referring now to FIG. 5, the clamp block flange 40 is adapted to be slidably fitted within the opening 35 of the clamping block 12 so that a lower transverse opening 43 in the block flange 40 aligns with the retainer pin opening 31 in the block 12 and an upper opening 42 in the block flange 40 aligns with the transverse spring pin opening 30 in the clamping block 12.

The clamp block flange 40 is U-shaped from a top view and has inclined surfaces 45 (at a 30° angle) extending downwardly from the top or upper surface a sufficient distance so that, starting with the clamp block flange 40 in the angular position shown in FIG. 3 with its bottom or lower surface resting on the inclined surface 37 of the clamping block 12, as the clamping block 12 is rotated on the lower retainer pin 33, the spring pins 32 will contact the inclined or ramp surfaces 45 and will be retracted thereby as rotation continues. When rotation of clamping block 12 with respect to linear motion shaft 11 and clamp block flange 40 about retainer pin 33 has progressed sufficiently so that openings 42 in clamp block flange 40 are in line with spring pins 32, the spring action of spring pins 32 will force them to engage openings 42 thus locking the clamping blocks 12 in place perpendicular to linear motion shaft 11. Spring pins 32 may be equipped with lanyards for ease of retraction in disassembly. The flange 40 has an outwardly extending lip portion 46 on its forward surface which is attached by welding or the like to the linear motion shaft 11 and is an integral part of the linear motion shaft 11 member. The pivotal movement permits adjustment of the clamping block jaw member to a skewed surface.

As shown in FIG. 1, on clamp blocks 12 and 26 the jaw members 28 for a changing block can be a generally U-shaped member where an attachment flange on the jaw member (with locking pins 41) is adapted to be received within the recess 27 in the lower face of the clamping block 12. Spring biased locking pin means 48 similar to the pin means 34 are adapted to be received within the pin openings in the block member 26 to lock the jaw member 28 in the recess 27 so that the inner surfaces of the jaw member can abut the forward and bottom surfaces of a clamping block member 26.

Figure 6:
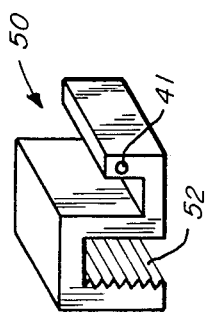

As shown in FIG. 6, a pair of jaw members 50 can be configured to provide an internal gripping recess 52 in the jaw which can be used to pull when the clamping blocks are moved away from one another.

As shown in FIG. 7, a pair of jaw members 59 can be configured to have an elongated member with an upwardly facing hook 56 which can be used for pulling when the clamping blocks are moved away from one another.

Figure 8:
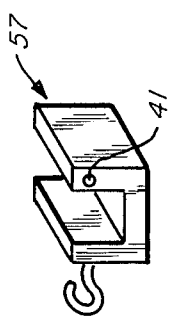

As shown in FIG. 8, a pair of jaw members 57 can be configured to include a hook member 58 attached to the jaw member which can be used for pulling when the clamping blocks are moved away from one another.

Figure 9:
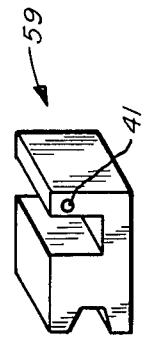

As shown in FIG. 9, a pair of jaw members 59 can be configured to provide a block in which a bar member can be engaged for rotation.

The device is portable and an attaching handle can be attached to the linear motion shaft at the center of gravity together with an appropriate on-off switch for the operation of the electrical motor in both directions.

In operation, by the use of suitable jaw members the device can be used to produce either pushing, pulling or tension compression forces on a work object and once attached, the device is self-locking by virtue of the self-locking threads used in actuator (22 and 23) and gear train 19.

As can readily be appreciated, the clamp blocks or jaw members provide solid interface surfaces that retain and support the jaw members during operation. The jaw members can be interchanged as desired to meet various interface requiremenmts. The device is capable of applying a force in either direction and can be made of extremely light weight, high strength materials for portable operations and is more versatile than the "jaws of life" devices.

It will be apparent to those skilled in the art that various changes may be made in the invention without departing from the spirit and scope thereof and therefore the invention is not limited by that which is enclosed in the drawings and specifications but only as indicated in the appended claims.

What is claimed is:

1. A linear force device for producing a linear actuation motion between at least two tool attachment housings including:
   an elongated linear motion shaft member;
   a fixed tool attachment housing attached to said motion shaft member near one end of said motion shaft member and having first tool attachment means;
   a movable tool attachment housing slidably mountd on said motion shaft member and having second attachment means in facing alignment with said first tool attachment means;
   tools means releasably coupled to each of said tool attachment means for engaging work objects therebetween, said tool means including interchangable tool members, each tool member having a flange with spring biased locking pins, wherein said first tool attachment means and said second tool attachment means include slots in said fixed and movable tool attachment housings for receiving said flanges of said interchangable tool members, and holes for receiving said spring biased locking pins to lock the tool members in place, and wherein said fixed and said movable tool attachment housings include spring biased disengagement means for cooperating with said spring biased locking pins to unlock said tool members;
   actuator means attached to said motion shaft member near the other end of said motion shaft member and having a reversible actuator mechanism in alignment with and attached to said second tool attachment means, said actuator mechanism being parallel with said motion shaft member and co-linear with said tool attachment means whereby upon operation of said actuator mechanism, said second tool attachment means are moved linearly on said motion shaft member selectively toward or away from said first tool attachment means for selectively applying compressive or tensile forces to the work object;
   said actuator means including a reversible motor for operating said actuator mechanism.

2. The apparatus as set forth in claim 1 wherein said fixed tool housing is attached to said motion shaft member by a pivot means and a releasable locking means, so configured that said fixed tool housing can be located in a first angular position relative to said linear motion shaft and as said fixed tool housing is rotated about the pivot means from the first angular position to a second angular position the the releasable locking means cooperates with fixed tool housing to releasable lock fixed tool housing in the second angular position.

3. The apparatus as set forth in claim 2 wherein said releasable locking means includes spring biased pin members in said fixed tool attachment housing for releasably engaging mating openings in said motion shaft member.

4. The apparatus as set forth in claim 1 wherein said actuator mechanism includes an inner shaft rotatably received in an internal thread of an outer shaft, said outer shaft being attached to said movable tool attachment means.

5. The apparatus as set forth in claim 4 wherein said inner shaft is coupled to reversible motor means.

6. The apparatus as set forth in claim 5 wherein said reversible motor means is d.c. operated.

7. The apparatus as set forth in claim 6 wherein said inner shaft is also coupled to a manual drive shaft.

8. The apparatus as set forth in claim 1 wherein a manipulating handle is attached to said motion shaft member at the center of gravity for the apparatus.

9. The apparatus as set forth in claim 1 wherein said actuator mechanism is also coupled to a manual drive shaft.

10. The apparatus as set forth in claim 9 wherein said reversible motor is d.c. operated.

11. The appartus as set forth in claim 10 wherein the actuator mechanism includes an inner shaft rotatably received in an internal thread of an outer shaft attached to said second movable tool attachment means.

12. The apparatus as set forth in claim 11 wherein said tool means includes a flange member fitting into a recess in said tool attachment means and work engaging surfaces on said tool means disposed in facing alignment with one another and in re-linear alignment with said actuator mechanism.

13. A linear force device for producing a linear actuation motion between at least two tool attachment housings including:

an elongated linear motion shaft member;

a fixed tool attachment housing attached to said motion shaft member near one end of said motion shaft member and having first tool attachment means, said first tool attachment means being pivotable with respect to said motion shaft member;

a movable tool attachment housing slidably mounted on said motion shaft member and having second tool attachment means in facing alignment with said first tool attachment means;

tool means releasably coupled to each of said tool attachment means for engaging work objects, wherein said tool means includes interchangeable tools, each having a flange, said flanges having biased locking pins, each of said tool attachment housings having a recess for receiving said flange of said interchangeable tools and further having biased disengagement pins cooperating with said biased locking pins in said flanges for locking said tool means with said tool attachment means and for unlocking therefrom; and actuator means for selectively applying compressive or tensile forces to work objects engaged by said tool means, said actuator means being attached to said motion shaft member near the other end of said motion shaft member, all elements of said actuator means being disposed entirely between the two ends of said motion shaft member such that the overall length of the linear force device does not change during operation of the actuator means, said actuator means having a reversible actuator mechanism in alignment with and attached to said movable tool attachment means, said actuator mechanism being parallel with said motion shaft member whereby, upon operation of said actuator mechanism, said moveable tool attachment means are moved linearly on said motion shaft member selectively toward or away from said fixed tool attachment means.

* * * * *